Jan. 29, 1957  J. H. HOLLOWAY  2,779,210
VIBRATION DAMPENER

Filed May 20, 1955  2 Sheets-Sheet 1

INVENTOR.
John H. Holloway
BY Louis O. French
Att'y

Jan. 29, 1957  J. H. HOLLOWAY  2,779,210
VIBRATION DAMPENER
Filed May 20, 1955  2 Sheets-Sheet 2
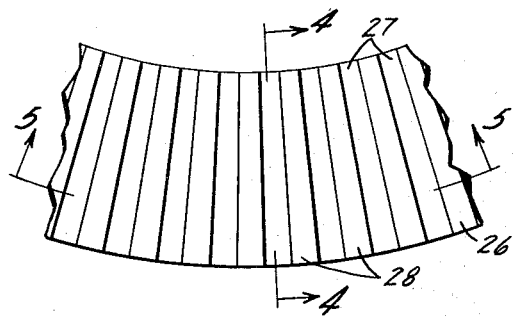
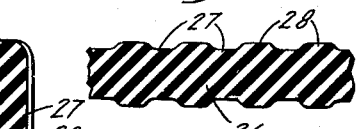
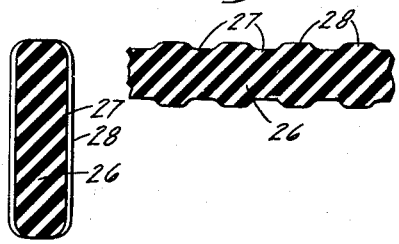
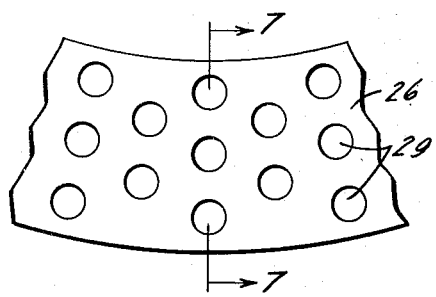
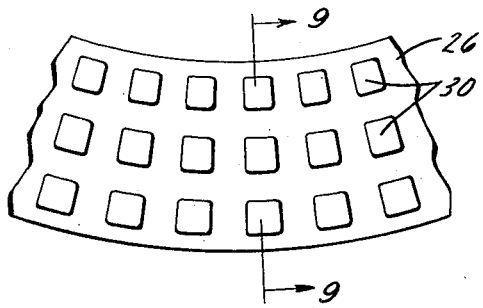
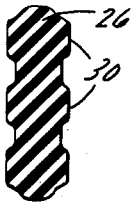
INVENTOR.
John H. Holloway
BY
Louis O. French,
Atty.

United States Patent Office 2,779,210
Patented Jan. 29, 1957

2,779,210

VIBRATION DAMPENER

John H. Holloway, Green Bay, Wis., assignor to Murphy Diesel Company, Milwaukee, Wis., a corporation of Delaware Application May 20, 1955, Serial No. 509,809

4 Claims. (Cl. 74—574)

The invention relates to torsional vibration dampeners and more particularly engine crankshaft vibration dampeners.

One of the objects of the invention is to provide a torsional vibration dampener in which the driving member and the floating or inertia member are connected to said plate by a plastic means which is cooled by air currents circulated through said members so as to prevent deterioration of said plastic means and consequent loss of its hysteresis.

A further object of the invention is to provide an improved form of rubber connection between the driving plate and the inertia member in the form of rubber disks whose connecting surfaces are formed as alternate depressions and elevations so that when the disk is clamped in place, high parts of its surface may move or flow only a short distance into lower parts of this surface to avoid high stresses being initially set up in the rubber that occur with the usual plane surfaces.

The invention further consists in the several features hereinafter described and more particularly defined by claims at the conclusion hereof.

In the drawings:

Fig. 3 is an elevation view of a portion of one of the rubber disks;

Fig. 4 is a vertical sectional view taken on the line 4—4 of Fig. 3;

Fig. 5 is a horizontal sectional view taken on the line 5—5 of Fig. 3;

Fig. 6 is a view similar to Fig. 3 showing certain modifications;

Fig. 7 is a vertical sectional view taken on the line 7—7 of Fig. 6;

Fig. 8 is a view similar to Fig. 3 showing another modification;

Fig. 9 is a vertical sectional view taken on the line 9—9 of Fig. 8.

Figure 1:
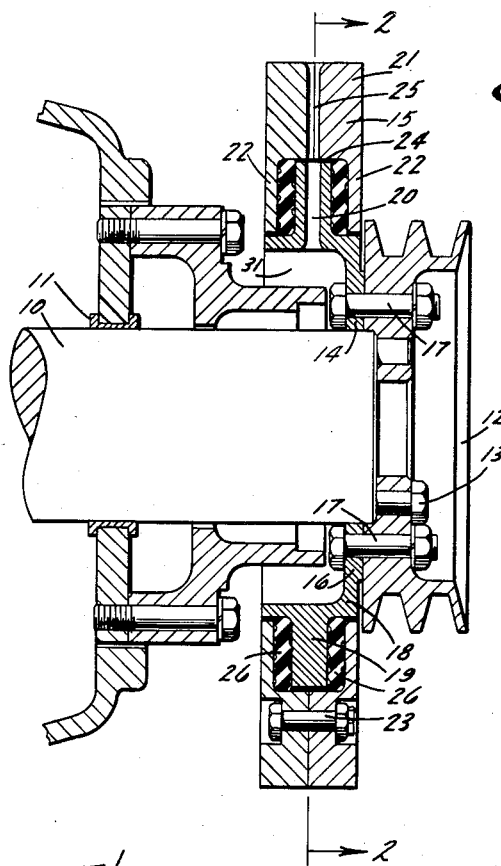
Fig. 1 is a detailed vertical cross-sectional view taken on the broken line 1—1 of Fig. 2.

Referring to the drawings, the numeral 10 designates the extended end of an engine crankshaft, 11 a journal for said shaft, and 12 a drive pulley secured by one or more bolts 13 to the crankshaft.

The torsional vibration dampener embodying the invention includes a drive member 14, a floating weight or inertia member 15, and resilient means operatively connecting said members 14 and 15 together and resisting angular displacement of said members relative to each other.

The drive member 14 is shown as provided with a web 16 secured to the drive pulley 12 and hence to the crankshaft by bolts 17 and provided with a flange 18 that has a centrally disposed annular web 19 of less width than the flange projecting therefrom. Circumferentially spaced, radially disposed slots 20 are formed in the web 19 and the contiguous portion of the flange 18.

Figure 2:
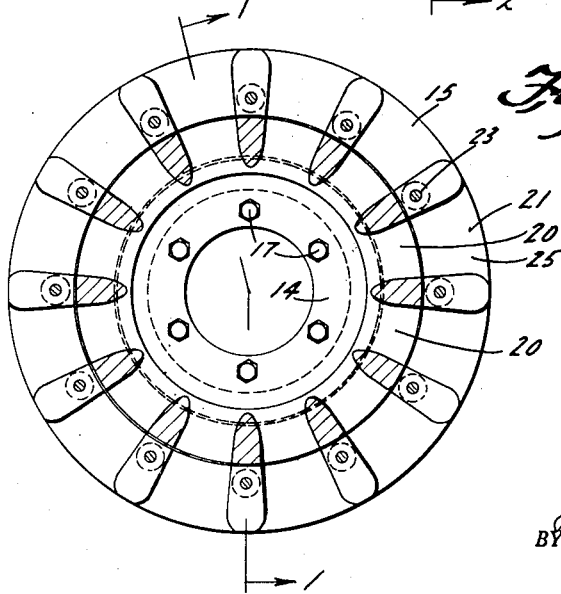
Fig. 2 is a detailed vertical cross-sectional view taken on the line 2—2 of Fig. 1.

The inertia member 15 is formed by a pair of complementary rings 21. Each ring 21 is recessed at its inner periphery to provide an exterior web 22, and when joined together by bolts 23, the recessed portions of the rings form an annular cavity 24. At circumferentially spaced intervals corresponding to the spacing of the slots 20, radially disposed slots 25 are formed in each ring extending from its periphery to the cavity 24 and thus form slots which serve as continuations of the slots 20 as shown in Fig. 2.

The resilient means, forming a driving connection between the members 14 and 15, comprises a pair of rubber rings 26 adapted to be clamped, by the tightening up of the bolts 23, between the webs 22 and the sides of the web 19 to resiliently resist angular displacement of the member 15 relative to its driver 14 by the hysteresis effect of the rubber.

In order to reduce the initial stress in the rubber set up by the clamping of the rings 26 as above described, the surface of each ring that contacts the drive and driven members is preferably broken up into a number of elevations and depressions. This surface may take various forms, some of which are shown in Figs. 3 to 9.

In Figs. 3 to 5 the alternate depressions and elevations are formed by radially disposed depressions 27 and radially disposed ribs 28.

In Figs. 6 and 7 the surface of the rings is interrupted at spaced intervals by the cavities or depressions 29.

In Figs. 8 and 9 the surface of the rings is interrupted at spaced intervals by elevated portions 30.

In any of the above forms as the disks are squeezed between the parts of the drive and inertia members, high parts of the surfaces of the disks can flow readily into the lower parts thereof to prevent high initial stresses being set up in the disks.

With the above construction as the shaft 10 revolves, the dampener above described revolves with it, and air is, therefore, free to flow from the cavity 31 through the passageways formed by the alined sets of slots 20 and 25, thus cooling or carrying heat away from the parts of the driver 14 and member 15 and thereby keeping these members cool and acting through them to keep the rubber disks or rings 26 cool so that their hysteresis effect may be preserved to resist angular displacements of the member 15 relative to the member 14.

By the term "rubber" I means to include any suitable yieldable plastic having the characteristics of rubber.

It is also to be noted that while the rings 26 are shown as one piece, they might be made in sections without departing from the invention.

I desire it to be understood that this invention is not to be limited to any particular form or arrangement of parts except in so far as such limitations are included in the claims.

What I claim as my invention is:

1. In a vibration dampener, the combination of a rotary drive member having a web provided with a plurality of circumferentially spaced, radially extending passages, an inertia member having a plurality of circumferentially spaced, radially extending passages alined with the passages in said web, and a yieldable plastic means forming a drive connection between said members disposed adjacent said passages and adapted to be cooled by the cooling effect of the air passing through said passages.

2. In a vibration dampener, the combination of a rotary drive member having an outer peripheral web provided with a plurality of circumferentially spaced, radially extending passages, an inertia member having a plurality of circumferentially spaced, radially extending passages alined with the passages in said web and having spaced webs laterally spaced from the web of said drive member, and a yieldable plastic means disposed between the web of said drive member and the webs of said inertia member to form a driving connection between said member and adapted to be cooled by the cooling effect of the air passing through said passages.

3. In a vibration dampener, the combination of a rotary drive member having an outer peripheral web provided with a plurality of circumferentially spaced, radially extending passages, an inertia ring member of complementary sections formed to provide a plurality of circumferentially spaced radially extending passages alined with the passages in said web and to provide webs at its inner periphery laterally spaced from the web of said drive member, a rubber ring interposed between each web of said inertia member and the web of said drive member, means for clamping said rings in driving relation between said members, said rubber rings being disposed adjacent said passages so as to be cooled by the cooling effect of air passing therethrough.

4. The vibration dampener as defined in claim 3 wherein the surfaces of the rings are provided with alternate elevations and depressions abutting the plain surfaces of said members permitting flowage of parts of said ring surfaces during the clamping of said rings to said members.

References Cited in the file of this patent
UNITED STATES PATENTS

| | | |
|---|---|---|
| 1,555,214 | Johnson | Sept. 29, 1925 |
| 1,790,516 | Williams | Jan. 27, 1931 |
| 1,925,071 | Griswold | Aug. 29, 1933 |
| 2,716,904 | Schuldt | Sept. 6, 1955 |